US008170285B2

United States Patent
Nakamori et al.

(10) Patent No.: US 8,170,285 B2
(45) Date of Patent: May 1, 2012

(54) SYSTEMS AND METHODS OF VEHICLE IMAGE PROCESSING

(75) Inventors: Takuma Nakamori, Wako (JP); Sachio Kobayashi, Wako (JP); Tomoyoshi Aoki, Wako (JP); Naoki Mori, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 828 days.

(21) Appl. No.: 11/995,798

(22) PCT Filed: Jul. 6, 2006

(86) PCT No.: PCT/JP2006/313464
§ 371 (c)(1),
(2), (4) Date: Nov. 24, 2008

(87) PCT Pub. No.: WO2007/010750
PCT Pub. Date: Jan. 25, 2007

(65) Prior Publication Data
US 2009/0284597 A1 Nov. 19, 2009

(30) Foreign Application Priority Data
Jul. 15, 2005 (JP) .................................. 2005-207574

(51) Int. Cl.
*G06K 9/00* (2006.01)
(52) U.S. Cl. ........ 382/104; 382/100; 382/168; 382/171; 382/199; 348/118; 701/1; 701/23; 701/26; 701/117
(58) Field of Classification Search .................. None
See application file for complete search history.

(56) References Cited

U.S. PATENT DOCUMENTS
5,790,403 A * 8/1998 Nakayama ...................... 701/28
(Continued)

FOREIGN PATENT DOCUMENTS
EP 1 089 231 A2 4/2001
(Continued)

OTHER PUBLICATIONS

Maezono, Lane space-marks extracting device has processing unit which measures color component of road area from image signal from image pickup device, and image correction processing unit which corrects color of image signal, published 20060810, JP 2006209209 (machine translation).*

(Continued)

*Primary Examiner* — Sath V Perungavoor
*Assistant Examiner* — Jason Heidemann
(74) *Attorney, Agent, or Firm* — Arent Fox LLP

(57) ABSTRACT

An image processing system and the like capable of recognizing a lane mark in a road image with high accuracy are provided even if a light illumination state on a road surface is partially different. According to the image processing system (100) mounted on a vehicle (10), a color component (Rij, Gij, Bij) of the first pixel (Pij) included in an area (Aij) set in the road image is corrected with reference to a color component (Rik, Gik, Bik) of a second pixel (Pik) in view of a fact that it is highly probable that the color component of the second pixel included in the area along with the first pixel is affected by a shadow or light on the road surface. This reduces the effect of the shadow or light on the road surface and the actual color of a road surface portion corresponding to the first pixel can be sufficiently reflected in the color components (Rij, Gij, Bij) of the first pixel (Pij) and consequently in a feature value (Qij). Therefore, a lane mark (M) and its edge (E) are recognized in the road image on the basis of the feature value (Qij) of each pixel (Pij) in the road image.

13 Claims, 8 Drawing Sheets

U.S. PATENT DOCUMENTS

| | | | |
|---|---|---|---|
| 6,493,458 B2 * | 12/2002 | Yasui et al. | 382/104 |
| 6,813,370 B1 * | 11/2004 | Arai | 382/104 |
| 6,819,779 B1 | 11/2004 | Nichani | |
| 2003/0103650 A1 * | 6/2003 | Otsuka et al. | 382/104 |
| 2004/0158366 A1 * | 8/2004 | Dieterle | 701/23 |

FOREIGN PATENT DOCUMENTS

| | | | |
|---|---|---|---|
| JP | 62-221800 A | | 9/1987 |
| JP | 07-244717 A | | 9/1995 |
| JP | 2000-030058 B2 | | 1/2000 |
| JP | 2001-022934 A | | 1/2001 |
| JP | 2001-088636 A | | 4/2001 |
| JP | 2003-337950 A | | 11/2003 |
| JP | 2006209209 | * | 8/2006 |
| WO | WO 99/40726 A2 | | 8/1999 |

OTHER PUBLICATIONS

Matthew A. Turk et al., "VITS—A Vision System for Autonomous Land Vehicle Navigation", IEEE Transactions on Pattern Analysis and Machine Intelligence, IEEE Service Center, Los Alamitos, Ca, US, vol. 10, No. 3, May 1, 1988, pp. 342-361.

Seung Gweon Jeong et al., "Real-Time Lane Detection for Autonomous Navigation", 2001 IEEE Intelligent Transportation Systems Conference Proceedings—Oakland (CA), USA, Aug. 25-29, 2001, pp. 508-513.

Stanford Exploration Project: "Causality and Spectral Factorization" [Online], Jun. 26, 2004. Retrieved from the Internet: URL:http://web.archive.org/web/20040629080754/http://sepwww.standford.edu/sep/prof/gee/hlx/paper_html/node20.html.

* cited by examiner

FIG.6(a)  ○ LANE MARK PORTION
          ● ROAD SURFACE PORTION
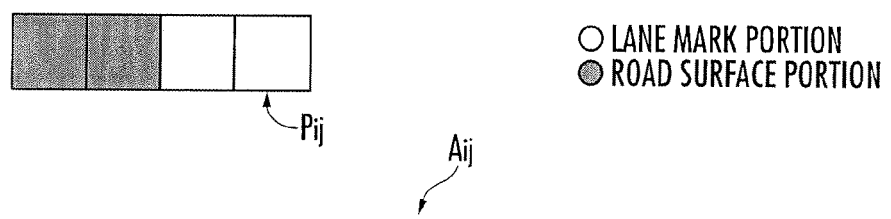
FIG.6(b)  ○ LANE MARK PORTION
          ● ROAD SURFACE PORTION
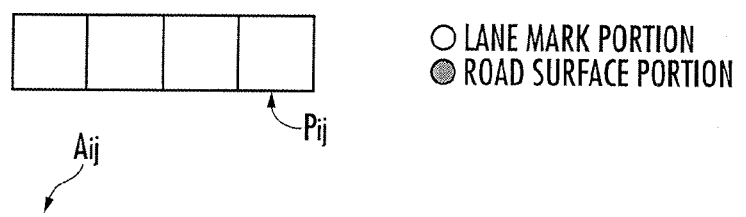
FIG.6(c)  ○ LANE MARK PORTION
          ● ROAD SURFACE PORTION
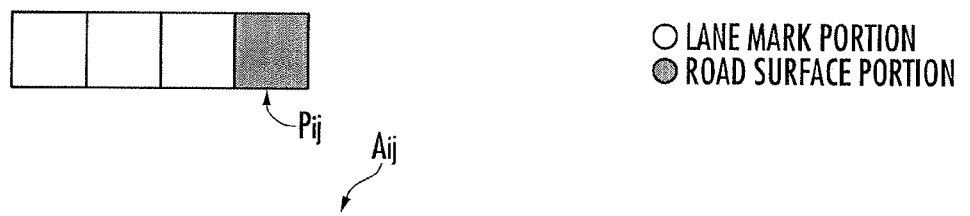
FIG.6(d)  ○ LANE MARK PORTION
          ● ROAD SURFACE PORTION
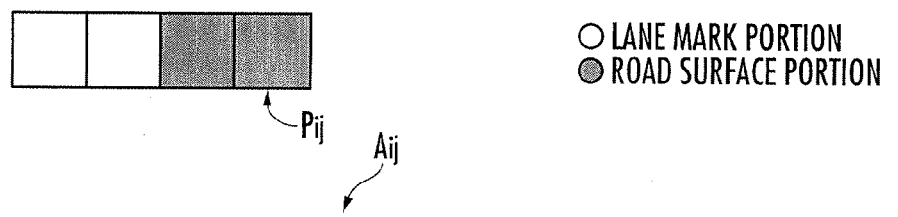
FIG.6(e)  ○ LANE MARK PORTION
          ● ROAD SURFACE PORTION
FIG.6(f)  ○ LANE MARK PORTION
          ● ROAD SURFACE PORTION

SYSTEMS AND METHODS OF VEHICLE IMAGE PROCESSING

CROSS-REFERENCE TO RELATED APPLICATION

This application is a National Stage entry of International Application No. PCT/JP2006/313464, filed Jul. 6, 2006, the entire specification claims and drawings of which are incorporated herewith by reference.

TECHNICAL FIELD

The present invention relates to an image processing system, a vehicle equipped with the image processing system, an image processing method, an image processing program, and a structure system of the image processing system.

BACKGROUND ART

Yellow lines are sometimes used as lane marks as well as white lines, and therefore there has been suggested a technical method of recognizing lane marks such as a white line, a yellow line, and the like by using a color image captured by an imaging means such as a color camera (refer to, for example, Japanese Patent No. 3333468).

DISCLOSURE OF THE INVENTION

Problem to be Solved by the Invention

In the case where a light illumination state on a road surface is partially different such as a case where a shadow S is cast on a lane mark M and other road surface portions, as shown in FIG. 3, due to a building or the like around the road or a case where the road surface is partially illuminated by a headlight of a vehicle, a color feature value of the road image in the portions concerned is different from others. This sometimes reduces the accuracy of recognizing the lane mark other than a white line such as a yellow line.

Therefore, it is an object of the present invention to provide an image processing system and image processing method capable of recognizing a lane mark in a road image with high accuracy even if the light illumination state on the road surface is partially different, a vehicle equipped with the image processing system, an image processing program which causes a computer to attain the image processing function, and a system for constructing the image processing system.

Means for Solving the Problem

In order to achieve the above object of the present invention, there is provided a vehicle having: an imaging means; an image processing system which performs image processing on the basis of a road image captured by the imaging means; and a vehicle traveling control system which controls the travel of the vehicle on the basis of a result of the image processing performed by the image processing system, wherein the image processing system includes: a first processing section which sets an area including a plurality of pixels while gradually moving the area in the road image; a second processing section which corrects a color component of a first pixel included in the front end of the area in a moving direction among the plurality of pixels included in the area by the first processing section with reference to a color component of a second pixel other than the first pixel among the plurality of pixels; a third processing section which calculates a feature value of the first pixel that depends on a noticeable color on the basis of the color component of the first pixel corrected by the second processing section; and a fourth processing section which recognizes a lane mark having the noticeable color in the road image on the basis of feature values of a plurality of pixels obtained by sequentially repeating the correction of the color component of the first pixel by the second processing section and the calculation of the feature value of the first pixel by the third processing section whenever the area is set by the first processing section.

In some cases, the actual color of the road is not sufficiently reflected in the color components of the first pixel due to the effect of a shadow (darkness) or light (brightness) on the road surface including the set area in the road image, by which a feature value that depends on the noticeable color in the first pixel may be suppressed to a low level. Therefore, if the color component of the first pixel is directly reflected in the feature value that depends on the noticeable color, there is a possibility of a reduction in the recognition accuracy of the lane mark having the noticeable color based on the feature value of the first pixel.

According to the vehicle of the present invention, the image processing system corrects the color component of the first pixel included in the area set in the road image with reference to the color component of the second pixel in view of a fact that it is highly probable that the color component of the second pixel included in the area along with the first pixel is affected by the shadow or light on the road surface. This reduces the effect of the shadow or light on the road surface and the actual color of a road surface portion corresponding to the first pixel can be sufficiently reflected in the color components of the first pixel and consequently in the feature value.

The area is set while it is gradually moved, and a pixel at the front end of the area in the moving direction among the plurality of pixels included in the area is considered as the first pixel and other pixels are considered as the second pixels. Therefore, if the color of a road surface portion corresponding to the front end of the area becomes different from the color of the road surface portion corresponding to the front end of the area set at the previous time, the color of the road surface portion corresponding to the first pixel is different from the color of the road surface portion corresponding to a part or all of the second pixels. For this reason, the color component of the first pixel is corrected with reference to the corresponding color component of the second pixel as described above, by which the actual color of the road surface portion corresponding to the first pixel can be prominently reflected in the color components of the first pixel and consequently in the feature value that depends on the noticeable color.

Then, the fourth processing section recognizes the lane mark M and its edge E in the road image on the basis of the feature value Qij of each pixel Pij in the road image.

According to the above view, even if the light illumination state on the road surface is partially different, the image processing system can recognize the lane mark having the noticeable color in the road image with high accuracy. It is then possible to control the travel of the vehicle appropriately in view of the actual position of the lane mark on the basis of a result of the image processing performed by the image processing system.

Furthermore, in the vehicle of the present invention, the first processing section sets a one-line continuous area arranged in the moving direction in the road image or an area having a one-line continuous part arranged more forward in the moving direction than the remainder of the area.

According to the vehicle of the present invention, if the color of the road surface portion corresponding to the first pixel of the area set at this time becomes different from the color of the road surface portion corresponding to the first pixel of the area set at the previous time, the color of the road surface portion corresponding to the first pixel can be different from the color of the road surface portion corresponding to a part or all of the second pixels in the area set at this time in view of a fact that the lane mark has a certain width. Thereby, the actual color of the road surface portion corresponding to the first pixel can be prominently reflected in the color components of the first pixel and consequently in the feature value that depends on the noticeable color.

Therefore, even if the light illumination state on the road surface is partially different, the image processing system can recognize the lane mark having the noticeable color in the road image with high accuracy. It is then possible to control the travel of the vehicle appropriately in view of the actual position of the lane mark on the basis of the result of the image processing performed by the image processing system.

Furthermore, in the vehicle of the present invention, the first processing section can set the area while adjusting the size, shape, or size and shape of the area according to the position of the road image.

According to the vehicle of the present invention, if the color of the road surface portion corresponding to the first pixel of the area set at this time becomes different from the color of the road surface portion corresponding to the first pixel of the area set at the previous time, one or both of the size and shape of the area can be adjusted in such a way that the color of the road surface portion corresponding to the first pixel is different from the color of the road surface portion corresponding to all or most of the second pixels in the area set at this time. Thereby, the actual color of the road surface portion corresponding to the first pixel can be prominently reflected in the color components of the first pixel and consequently in the feature value that depends on the noticeable color. Therefore, even if the light illumination state on the road surface is partially different, the image processing system can recognize the lane mark having the noticeable color in the road image with high accuracy. It is then possible to control the travel of the vehicle appropriately in view of the actual position of the lane mark on the basis of the result of the image processing performed by the image processing system.

Still further, in the vehicle of the present invention, the first processing section can set the area while adjusting the size, shape, or size and shape of the area on the basis of a result of the correction of the color component of the first pixel by the second processing section, a result of the calculation of the feature value of the first pixel by the third processing section, a result of the recognition of the lane mark by the fourth processing section, and a part or all of the traveling condition of the vehicle.

If the second pixels included in the area are too few, only the color of the road surface portion which is locally different from the original noticeable color due to peeling-off or the like of the lane mark might be reflected in the color components of second pixels. It therefore could lead to an excessive correction amount of the color component of the first pixel based on the color component of the second pixel in the area set at this time. Consequently, there is a possibility of a reduction in accuracy of recognizing the lane mark based on the feature value that depends on the noticeable color of the first pixel such that a faded portion of the lane mark is recognized as the edge of the lane mark.

On the other hand, if the second pixels included in the area are excessive, a plurality of colors existing in the road surface portion corresponding to the area are reflected in the color components of the second pixels. Therefore, there is a possibility of an insufficient correction amount of the color component of the first pixel based on the color component of the second pixel in the area set at this time. Consequently, there is a possibility of a reduction in accuracy of recognizing the lane mark based on the feature value that depends on the noticeable color of the first pixel such that the edge of the lane mark is not recognized as the edge of the lane mark.

Furthermore, in which position the lane mark is recognized to be located in the road image depends on the previous recognition result of the lane mark. For example, the lane mark is unlikely to be recognized in a position that seriously lacks validity (continuity) in view of the position of the lane mark recognized at the previous time in the road image though the traveling condition of the vehicle is stable, and the travel of the vehicle should not be controlled on the basis of the recognition result that lacks validity.

Additionally, in which position the lane mark is recognized to be located in the road image also depends on the traveling condition of the vehicle. For example, when the vehicle is traveling while making a curve to the left, it is predicted that the lane mark is recognized in the position depending on the degree of the curve of the road in the road image.

According to the vehicle of the present invention, in view of the above circumstances, the area is adjusted in one or both of the size and shape before it is reset or set anew, on the basis of the result of the correction of the color component of the first pixel, the result of the calculation of the feature value of the first pixel that depends on the noticeable color, the result of the recognition of the lane mark by the fourth processing section, and a part or all of the traveling condition of the vehicle. This prevents an area setting that reduces the lane mark recognition accuracy, which leads to an improvement of the lane mark recognition accuracy. It is then possible to control the travel of the vehicle appropriately in view of the actual position of the lane mark on the basis of the result of the image processing performed by the image processing system.

Furthermore, in the vehicle of the present invention, the second processing section corrects the color component of the first pixel with reference to the color component of the second pixel based on a luminance value of the second pixel; and the third processing section calculates the feature value of the first pixel that depends on the noticeable color on the basis of the corrected color component of the first pixel based on a luminance value of the first pixel.

If the color component of the first pixel is corrected with reference to the color component of the second pixel corresponding to the color component of the first pixel as described above, the feature value of the first pixel that depends on the noticeable color is likely to be excessively large or small due to a difference in brightness between the first pixel and the second pixel. For example, if the first pixel corresponds to a bright road surface portion while the second pixel corresponds to a dark road surface portion, the feature value of the first pixel becomes excessively large and there is a possibility that the first pixel is incorrectly recognized to correspond to a lane mark portion having the noticeable color, instead of the road surface portion. On the other hand, if the first pixel corresponds to a dark lane mark portion while the second pixel corresponds to a bright lane mark portion, the feature value of the first pixel becomes excessively small and there is a possibility that the first pixel is incorrectly recognized to correspond to a road surface portion, instead of the lane mark portion.

According to the vehicle of the present invention, in view of the above circumstances, the color component of the first pixel is corrected with reference to the "luminance value (index representing the brightness)" of the second pixel and with reference to the color component of the second pixel corresponding to the color component of the first pixel. In addition, the feature value of the first pixel is calculated on the basis of the corrected color component of the first pixel based on the luminance value of the first pixel. This can reduce or eliminate the effect of the difference in brightness between the first and second pixels on the feature value of the first pixel and further prevent the reduction in the lane mark recognition accuracy based on the feature value of the first pixel. It is then possible to control the travel of the vehicle appropriately in view of the actual position of the lane mark on the basis of the result of the image processing performed by the image processing system.

In order to achieve the above object of the present invention, there is provided an image processing system comprising: a first processing section which sets an area including a plurality of pixels while gradually moving the area in a road image captured by an imaging means mounted on a vehicle; a second processing section which corrects a color component of a first pixel included in the front end of the area in a moving direction among the plurality of pixels included in the area by the first processing section with reference to a color component of a second pixel other than the first pixel among the plurality of pixels; a third processing section which calculates a feature value of the first pixel that depends on a noticeable color on the basis of the color component of the first pixel corrected by the second processing section; and a fourth processing section which recognizes a lane mark having the noticeable color in the road image on the basis of feature values of a plurality of pixels obtained by sequentially repeating the correction of a color signal of the first pixel by the second processing section and the calculation of the feature value of the first pixel by the third processing section whenever the area is set by the first processing section.

According to the image processing system of the present invention, the lane mark can be recognized in the road image with high accuracy even if the light illumination state on the road surface is partially different.

Furthermore, in the image processing system of the present invention, the first processing section sets a one-line continuous area arranged in the moving direction in the road image or an area having a one-line continuous part arranged more forward in the moving direction than the remainder of the area.

Still further, in the image processing system of the present invention, the first processing section can set the area while adjusting the size, shape, or size and shape of the area according to the position of the road image.

Furthermore, in the image processing system of the present invention, the first processing section can set the area while adjusting the size, shape, or size and shape of the area on the basis of a result of the correction of the color component of the first pixel by the second processing section, a result of the calculation of the feature value of the first pixel by the third processing section, a result of the recognition of the lane mark by the fourth processing section, and a part or all of the traveling condition of the vehicle.

Furthermore, in the image processing system of the present invention, the second processing section corrects the color component of the first pixel with reference to the color component of the second pixel based on a luminance value of the second pixel; and the third processing section calculates the feature value of the first pixel that depends on the noticeable color on the basis of the corrected color component of the first pixel based on a luminance value of the first pixel.

In order to achieve the above object of the present invention, there is provided an image processing method comprising: a first processing step of setting an area including a plurality of pixels while gradually moving the area in a road image captured by an imaging means mounted on a vehicle; a second processing step of correcting a color component of a first pixel included in the front end of the area in a moving direction among the plurality of pixels included in the area in the first processing step with reference to a color component of a second pixel other than the first pixel among the plurality of pixels; a third processing step of calculating a feature value of the first pixel that depends on a noticeable color on the basis of the color component of the first pixel corrected in the second processing step; and a fourth processing step of recognizing a lane mark having the noticeable color in the road image on the basis of a feature value of the plurality of pixels obtained by sequentially repeating the correction of a color signal of the first pixel in the second processing step and the calculation of the feature value of the first pixel in the third processing step whenever the area is set in the first processing step.

According to the image processing method of the present invention, the lane mark having the noticeable color can be recognized in the road image with high accuracy even if the light illumination state on the road surface is partially different.

In order to achieve the above object of the present invention, there is provided an image processing program causing a computer to attain: a first processing function of setting an area including a plurality of pixels while gradually moving the area in a road image captured by an imaging means mounted on a vehicle; a second processing function of correcting a color component of a first pixel included in the front end of the area in a moving direction among the plurality of pixels included in the area by the first processing function with reference to a color component of a second pixel other than the first pixel among the plurality of pixels; a third processing function of calculating a feature value of the first pixel that depends on a noticeable color on the basis of the color component of the first pixel corrected by the second processing function; and a fourth processing function of recognizing a lane mark having the noticeable color in the road image on the basis of feature values of a plurality of pixels obtained by sequentially repeating the correction of a color signal of the first pixel by the second processing function and the calculation of the feature value of the first pixel by the third processing function whenever the area is set by the first processing function.

According to the program of the present invention, the computer is provided with the functions enabling the computer to recognize the lane mark having the noticeable color in the road image with high accuracy even if the light illumination state on the road surface is partially different.

In order to achieve the above object of the present invention, there is provided a structure system of an image processing system wherein a part or all of the image processing program is distributed or broadcast to a computer mounted on the vehicle in order to construct the image processing system.

According to the structure system of the present invention, it is possible to construct the image processing system capable of recognizing the lane mark having the noticeable color in the road image with high accuracy by distributing or broadcasting a part or all of the program to the computer mounted on the vehicle at an arbitrary timing even if the light illumination state on the road surface is partially different.

BRIEF DESCRIPTION OF THE DRAWINGS

FIG. 6 is an illustrative diagram of a plurality of pixels included in an area.

BEST MODE FOR CARRYING OUT THE INVENTION

Preferred embodiments of a vehicle, an image processing system, an image processing method, an image processing program, and a structure method of the image processing system according to the present invention will be described below by using the accompanying drawings.

Figure 1:
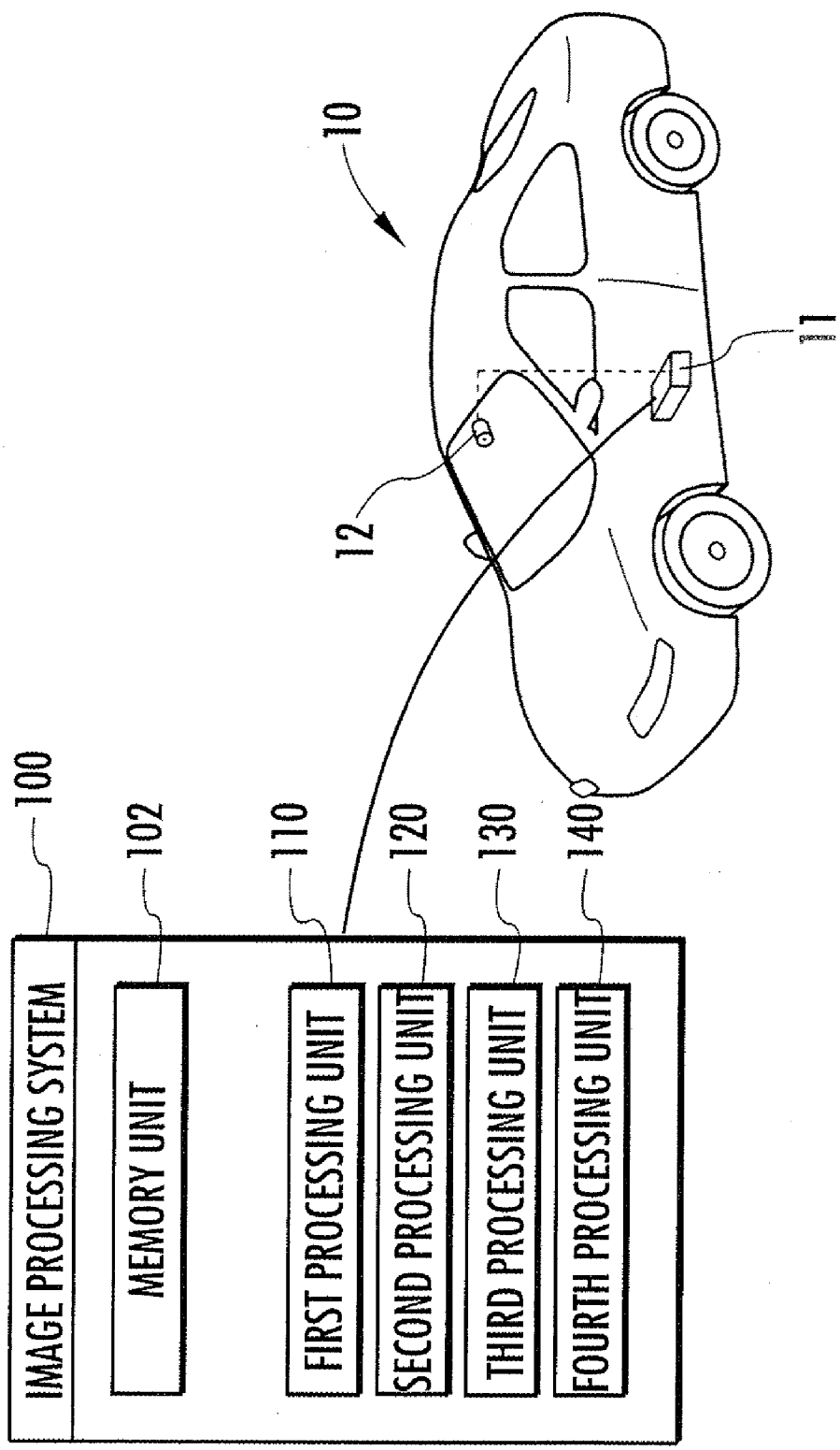
FIG. 1 is a configuration schematic diagram of a vehicle and an image processing system mounted thereon according to one embodiment of the present invention.

A vehicle 10 shown in FIG. 1 is equipped with an electronic control unit (computer) 11 and a camera (an imaging means) 12 which captures a color image of a road ahead of the vehicle 10.

The electronic control unit 11 constitutes an image processing system 100 as hardware mounted on the vehicle 10 together with the "image processing program" of the present invention as software. Furthermore, the electronic control unit 11 constitutes a "vehicle traveling condition control system" which controls the traveling condition including the lateral position of the vehicle 10 on the basis of a result of image processing performed by the image processing system 100. The image processing system 100 includes a memory section 102, a first processing section 110, a second processing section 120, a third processing section 130, and a fourth processing section 140. Each of the first processing section 110, the second processing section 120, the third processing section 130, and the fourth processing section 140 is composed of hardware such as a CPU, ROM, RAM, I/O and the like and the "image processing program" of the present invention for causing the hardware to function as each processing section. Although the image processing program can be stored in a memory of the in-vehicle computer from the beginning, alternatively a part or all of the image processing program can be distributed or broadcast from one or more servers or from a structure system composed of an artificial satellite or the like, if necessary, to the computer at an arbitrary timing such as, for example, upon request from a driver or the in-vehicle computer. The first processing section 110, the second processing section 120, the third processing section 130, and the fourth processing section 140 can be each formed of independent hardware separate from each other or can be a part of common hardware.

The memory section 102 stores a method of setting an area by the first processing section 110, a method of correcting a color component of a first pixel by the second processing section 120, a method of calculating a feature value that depends on a noticeable color of the first pixel by the third processing section 130, a method of recognizing a lane mark having the noticeable color based on feature values by the fourth processing section 140, and the like.

The first processing section 110 sets an area including a plurality of pixels in the road image while moving the area gradually.

The second processing section 120 corrects a color component of the "first pixel" included in the front end of the area in the moving direction among the plurality of pixels included in the area by the first processing section 110 with reference to a color component of a "second pixel" other than the first pixel among the plurality of pixels.

The third processing section 130 calculates the "feature value" of the first pixel that depends on the noticeable color on the basis of the color component of the first pixel corrected by the second processing section 120.

The fourth processing section 140 recognizes a lane mark having the noticeable color in the road image on the basis of feature values of a plurality of pixels, which have been obtained by sequentially repeating the correction of the color component of the first pixel by the second processing section 120 and the calculation of the feature value of the first pixel by the third processing section 130, whenever an area is set by the first processing section 110.

The image processing method performed by the image processing system 100 mounted on the vehicle 10 having the above configuration will now be described by using FIG. 2 to FIG. 8.

Figure 2:
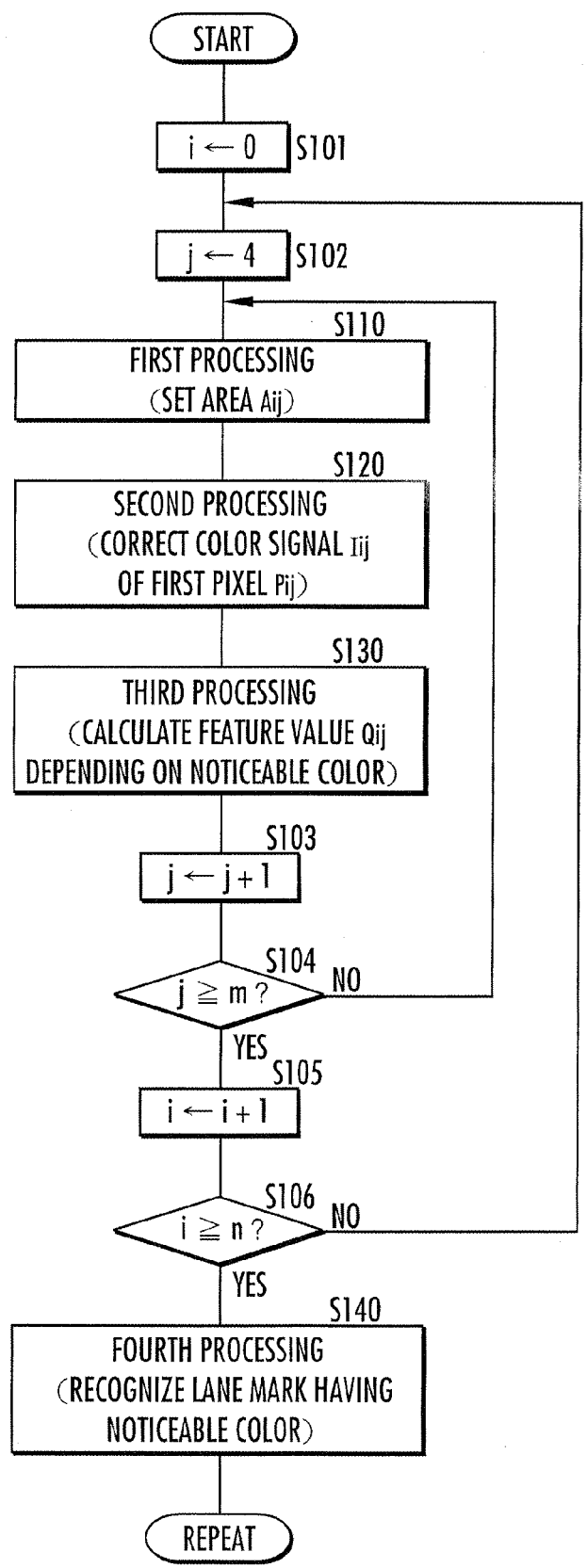
FIG. 2 is an explanatory diagram of an image processing method according to one embodiment of the present invention.
Figure 3:
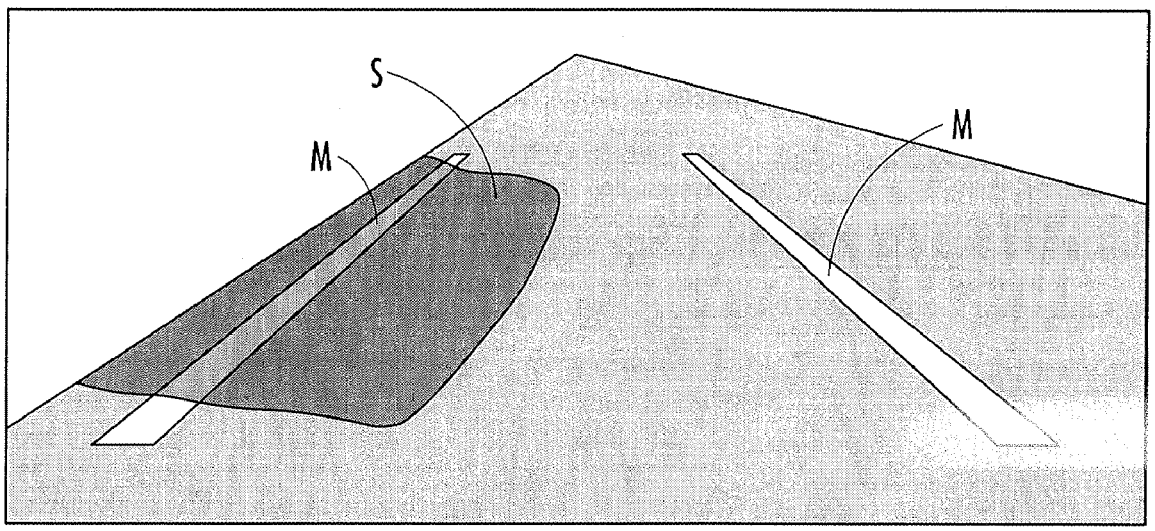
FIG. 3 is an illustrative diagram of a road image.

First, the first processing section 110 sets an index i (i=0, 1, 2, - - -, m−1) representing a row number having a ground color to "0" (S101 in FIG. 2) and sets an index j (j=0, 1, 2, - - -, n−1) representing a column number of the left color to "4" (S102 in FIG. 2) in a road image as shown in FIG. 3, which is composed of m×n pixels, captured by a camera 12. In the road image shown in FIG. 3, the shadow S is cast on the left-hand lane mark M and a road surface portion therearound in the right- and left-hand lane marks M of the traffic lane for the vehicle 10.

Figure 4:
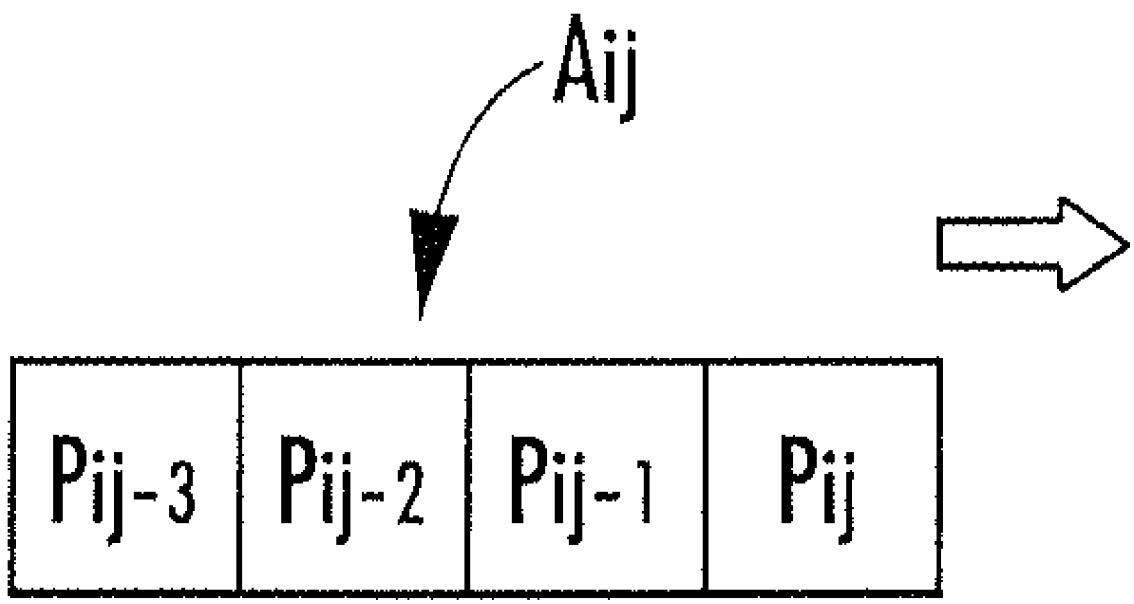
FIG. 4 is an illustrative diagram of an area which is set in first processing.

Under the circumstances, the first processing section 110 performs the "first processing" (S110 in FIG. 2). More specifically, as shown in FIG. 4, the first processing section 110 sets an area Aij having the size and shape of one row by four columns, which includes a plurality of horizontally-aligned pixels in the road image and is identified by the position of the rightmost pixel Pij among the plurality of pixels. If the index representing the column number is set to "2," the area Ai2 having a size and shape of one row by two columns can be set, and if the index representing the column number is set to "3," an area Ai3 having a size and shape of one row by three columns can be set.

Subsequently, the second processing section 120 performs the "second processing" (S120 in FIG. 2). More specifically, the second processing section 120 corrects the color signal Iij=(Rij, Gij, Bij) of the first pixel Pij at the right end (the front end of the area Aij in the moving direction) among the plurality of pixels Pis (s=j−3, j−2, j−1, and j) included in the area Aij set by the first processing section 110 with reference to the color signal Iik of the second pixel Pik (k<j) other than the first pixel Pij among the plurality of pixels, by which a corrected color signal I'ij of the first pixel Pij is obtained. Specifically, a luminance value Vik of each of the second pixels Pik is determined according to the following equation (1), a matrix W of a correction factor is determined according to the following equation (2), and the corrected color signal I'ij of the first pixel Pij is determined according to the following equation (3) ("diag" represents a diagonal matrix and "t" represents a transposition).

$$Vik = [\alpha, \beta, \gamma] \cdot {}^t (Rik, Gik, Bik) \quad (1)$$
$$= \alpha Rik + \beta Gik + \gamma Bik$$
$$(\alpha > 0, \beta > 0, \gamma > 0, \alpha + \beta + \gamma = 1)$$

$$W = \mathrm{diag}\left[\sum kVik / \sum kRik, \sum kVik / \sum kGik, \sum kVik / \sum kBik\right] \quad (2)$$
$$\equiv \mathrm{diag}[V/R, V/B, V/G]$$

$${}^tI'ij = W \cdot {}^t Iij \quad (3)$$
$$= \mathrm{diag}[V/R, V/B, V/G] \cdot {}^t (Rij, Gij, Bij)$$
$$= {}^t[(V/R)Rij, (V/G)Gij, (V/B)Bij]$$

Thereafter, the third processing section 130 performs the "third processing" (S130 in FIG. 2). More specifically, the third processing section 130 calculates a feature value Qij of the first pixel Pij that depends on the noticeable color on the basis of the color signal I'ij of the first pixel Pij corrected by the second processing section 120. For example, if the noticeable color is "yellow," in other words, a color whose R value is greater than its B value, the luminance value Vij of the first pixel Pij is calculated according to the following equation (4) on the basis of the color signal Iij of the first pixel Pij and the feature value Qij of the first pixel Pij is calculated according to the following equation (5a), (5b), or (5c) on the basis of the corrected color signal I'ij of the first pixel Pij and, if necessary, the luminance value Vij of the first pixel Pij.

$$Vij = [\alpha, \beta, \gamma] \cdot {}^t (Rij, Gij, Bij) \quad (4)$$
$$= \alpha Rij + \beta Gij + \gamma Bij$$
$$(\alpha > 0, \beta > 0, \gamma > 0, \alpha + \beta + \gamma = 1)$$

$$Qij = (1/Vij, 0, 1/Vij) \cdot I'ij \quad (5a)$$
$$= (V/Vij)\{(Rij/R) + (Bij/B)\}$$

$$Qij = (1/Vij, 0, -1/Vij) \cdot I'ij \quad (5b)$$
$$= (V/Vij)\{(Rij/R) - (Bij/B)\}$$

$$Qij = (Rij/R)/(Bij/B) \quad (5c)$$

The feature value Qij calculated according to the equation (5a) is obtained by dividing (normalizing) the sum of the R component and the G component of the corrected color signal I'ij of the first pixel Pij by the luminance value Vij of the first pixel Pij. Furthermore, the feature value Qij calculated according to the equation (5b) is obtained by dividing a difference between the R component and the G component of the corrected color signal I'ij of the first pixel Pij by the luminance value Vij of the first pixel Pij. Furthermore, the feature value Qij calculated according to the equation (5c) is a ratio of the R component to the G component of the corrected color signal I'ij of the first pixel Pij.

After the feature value Qij of the first pixel Pij is calculated, the first processing section 110 increments the index j, which represents the column number, by "1" (S103 in FIG. 2) and it is determined whether or not the index j is equal to or greater than the number of horizontal pixels m of the road image (S104 in FIG. 2). The increment of the index j can be "2" or a greater value, to the extent of not interfering with the lane mark recognition process in the road image described later.

Then, if the index j is determined to be less than the number of horizontal pixels m of the road image (S104 in FIG. 2: NO), the first processing to the third processing are performed (S110 to S130 in FIG. 2). Since a new area Aij is set whenever the index j representing the column number is incremented by "1," the area Aij is updated while moving to the right in units of a pixel. The first pixel Pij at the right end among the plurality of pixels included in the area Aij is a pixel included in the front end of the area Aij in the moving direction (the direction indicated by an arrow in FIG. 4), namely in the right direction.

On the other hand, if the index j is determined to be equal to or greater than the number of horizontal pixels m of the road image (S104 in FIG. 2: YES), the first processing section 110 increments the index i, which represents the row number, by "1" (S105 in FIG. 2) and it is determined whether or not the index i is equal to or greater than the number of vertical pixels n of the road image (S106 in FIG. 2). The increment of the index i can be "2" or a greater value, to the extent of not interfering with the lane mark recognition process in the road image described later.

If the index i representing the row number is determined to be less than the number of vertical pixels n of the road image (S106 in FIG. 2: NO), the first processing section 110 sets the index j representing the column number to "4" again (S102 in FIG. 2) and then the first processing to the third processing are performed (S110 to S130 in FIG. 2). If the index i exceeds one or more given values, a small-sized area Aij can be set. Thereby, for example, the width of the area Aij shown in FIG. 4 is set to be smaller toward the top of the road image.

On the other hand, if the index i is determined to be equal to or greater than the number of vertical pixels n of the road image (S106 in FIG. 2: YES), the fourth processing section 140 performs the "fourth processing" (S140 in FIG. 2). More specifically, the fourth processing section 140 recognizes the lane mark in the road image on the basis of the feature value Qij of each pixel Pij in the road image.

For example, the following discusses a case where, as shown in FIG. 5($a$), a pixel Pij1=(Xj1, Yi) corresponds to the left end of the left-hand lane mark M; a pixel Pij2=(Xj2, Yi) corresponds to the right end of the left-hand lane mark M; a pixel Pij3=(Xj3, Yi) corresponds to an end of the shadow S on the road surface; a pixel Pij4=(Xj4, Yi) corresponds to the left end of the right-hand lane mark M; and a pixel Pij5=(Xi5, Yi) corresponds to the right end of the right-hand lane mark M in the road image shown in FIG. 3.

In this case, the feature values Qij that depend on the noticeable color of the plurality of one-line pixels Pij (j=0, 1, 2, - - -, m$^{-1}$) vary with an increase in the X coordinate of the road image as shown in FIG. 5($b$).

More specifically, the feature value Qij remarkably increases when X is Xj1 and Xj4. In other words, the area Aij moves to the right from the previous position and is updated, by which the feature value Qij that depends on the noticeable color of the first pixel Pij remarkably increases when the first pixel Pij corresponds to the left end of the lane mark M and the second pixel Pik (k=j1-3, j1-2, j1-1) corresponds to a road surface portion on the left side of the lane mark M as shown in FIG. 6($a$). This is because the color component Rij, Gij, or Bij of the first pixel Pij is corrected with reference to the sum total R, G, or B of the corresponding color component of the second pixels Pik, which reduces or eliminates the effect of the shadow S or light on the road surface and emphasizes a difference between the first pixel Pij and the second pixels Pik such that the first pixel Pik includes the noticeable color (the color of the lane mark M) while the second pixels Pik include some other color (the color of the road) than the noticeable color.

For example, if the lane mark M is yellow and the road is gray, the R component is greater than the B component of the pixel corresponding to the lane mark M, while there is only a small difference between the R component and the B component of the pixel corresponding to the road. If the shadow S is cast on the lane mark M (See FIG. 3), however, the R component of the pixel corresponding to the lane mark M decreases. If the shadow is cast on the road similarly, however, the R component of the pixel corresponding to the road decreases, too. Therefore, the R component of the pixel corresponding to the lane mark M is corrected with reference to the R component of the pixel corresponding to the road, which can compensate for the decrease caused by the effect of the shadow S in the R component of the pixel corresponding to the lane mark M (See equations (1) to (3)). This allows the calculation of the feature value Qij of the pixel Pij corresponding to the lane mark M with the effect of the shadow reduced or eliminated (See equations (4), and (5a) to (5c)).

In addition, the feature value Qij that has once increased remarkably decreases gradually. More specifically, the area Aij moves to the right from the previous position and is updated, by which the feature value Qij that depends on the noticeable color of the first pixel Pij gradually decreases when the first pixel Pij corresponds to a part of the lane mark M while a part or all of the second pixels Pik correspond to a part of the lane mark M as shown in FIG. 6(b) or FIG. 6(c). This is because each color component of the first pixel Pij is corrected with reference to the sum total of each color component of the second pixels Pik, which gradually reduces the difference between the first pixel Pij and the second pixels Pik such that the first pixel Pik includes the color of the lane mark M while the second pixels Pik include the color of the road.

Furthermore, the feature value Qij remarkably decreases when X is Xj2 and Xj5. Specifically, the area Aij moves to the right from the previous position and is updated, by which the feature value Qij that depends on the noticeable color of the first pixel Pij remarkably decreases when the first pixel Pij corresponds to a road surface portion on the right side of the lane mark M while the second pixels Pik correspond to a part of the lane mark M as shown in FIG. 6(d). This is because the color component Rij, Gij, or Bij of the first pixel Pij is corrected with reference to the sum total R, G, or B of each color component of the second pixels Pik, which reduces or eliminates the effect of the shadow S or light on the road and emphasizes a difference between the first pixel Pij and the second pixels Pik such that the first pixel Pik includes some other color (the color of the road) than the noticeable color while the second pixels Pik include the noticeable color (the color of the lane mark M).

For example, if the lane mark M is yellow and the road is gray, the R component is greater than the B component of the pixel corresponding to the lane mark M and there is only a small difference between the R component and the B component of the pixel corresponding to the road. If light shines on the lane mark M, however, the B component of the pixel corresponding to the lane mark M increases. If light shines on the road similarly, however, the B component of the pixel corresponding to the road increases, too. Therefore, the B component of the pixel corresponding to the lane mark M is corrected with reference to the B component of the pixel corresponding to the road, which can compensate for the increase caused by the effect of the light in the B component of the pixel corresponding to the lane mark M (See equations (1) to (3)). This allows the calculation of the feature value Qij of the pixel Pij corresponding to the lane mark M with the effect of the light reduced or eliminated (See equations (4), and (5a) to (5c)).

In addition, the feature value Qij that has once decreased remarkably increases gradually. More specifically, the area Aij moves to the right from the previous position and is updated, by which the feature value Qij that depends on the noticeable color of the first pixel Pij gradually decreases when the first pixel Pij corresponds to a road surface portion on the right of the lane mark M while a part or all of the second pixels Pik correspond to the road surface portion as shown in FIG. 6(e) or FIG. 6(f). This is because the color component Rij, Gij, or Bij of the first pixel Pij is corrected with reference to the sum total R, G. or B of each color component of the second pixels Pik, which gradually reduces the difference between the first pixel Pij and the second pixels Pik such that the first pixel Pik includes the color of the road while the second pixels Pik include the noticeable color (the color of the lane mark M).

Furthermore, the feature value Qij is maintained almost constantly when X is around Xj3. Specifically, the area Aij moves to the right from the previous position and is updated, by which the feature value Qij that depends on the noticeable color of the first pixel Pij is maintained almost constantly when the first pixel Pij corresponds to a bright road surface portion while the second pixels Pik correspond to a dark road surface portion (the shadow S is cast thereon) of the road. This is because each color component Rij, Gij, or Bij of the first pixel Pij is corrected with reference to the sum total R, G, or B of each color component of the second pixels Pik with reference to the sum total Q of a luminance value of the second pixels Pik and the feature value Qij of the first pixel Pij is calculated on the basis of the corrected color component Rij', Gij', or Bij' with reference to a luminance value Vij of the first pixel Pij. In other words, each color component Rij, Gij, or Bij of the first pixel Pij is corrected with reference to a ratio R/V, G/V, or B/V of the sum total of the color component to the sum total of the luminance value and the feature value Qij of the first pixel Pij is calculated on the basis of a ratio Rij'/Vij, Gij'/Vij, or Bij'/Vij of each corrected color component to the luminance value Vij of the first pixel Pij. It then reduces or eliminates the effect of the shadow S or light on the road and exposes the fact that the first pixel Pij and the second pixel Pik each include some other color (the color of the road) than the noticeable color.

Figure 5A:
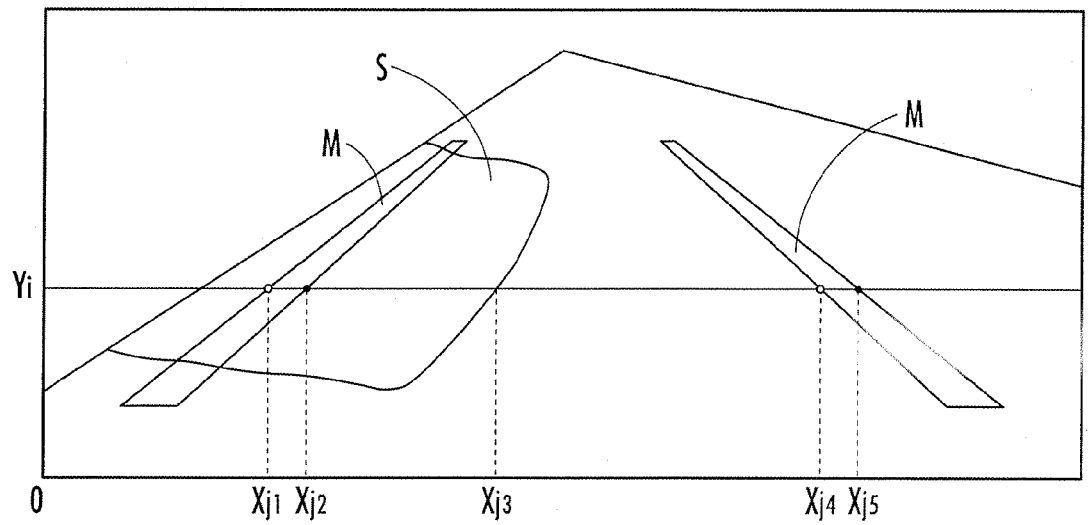
FIG. 5 is an explanatory diagram of fourth processing (a lane mark recognition process).
Figure 5B:
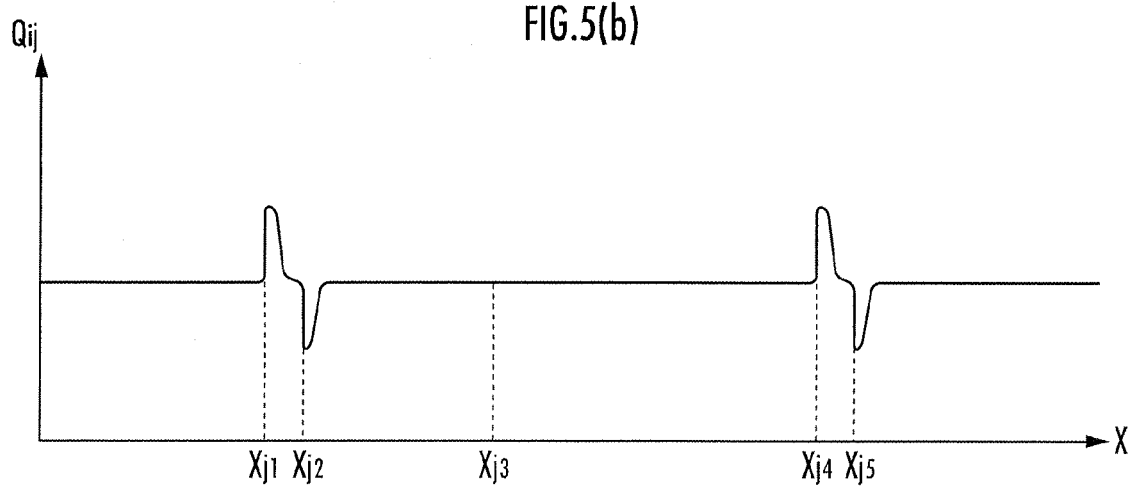
Figure 7:
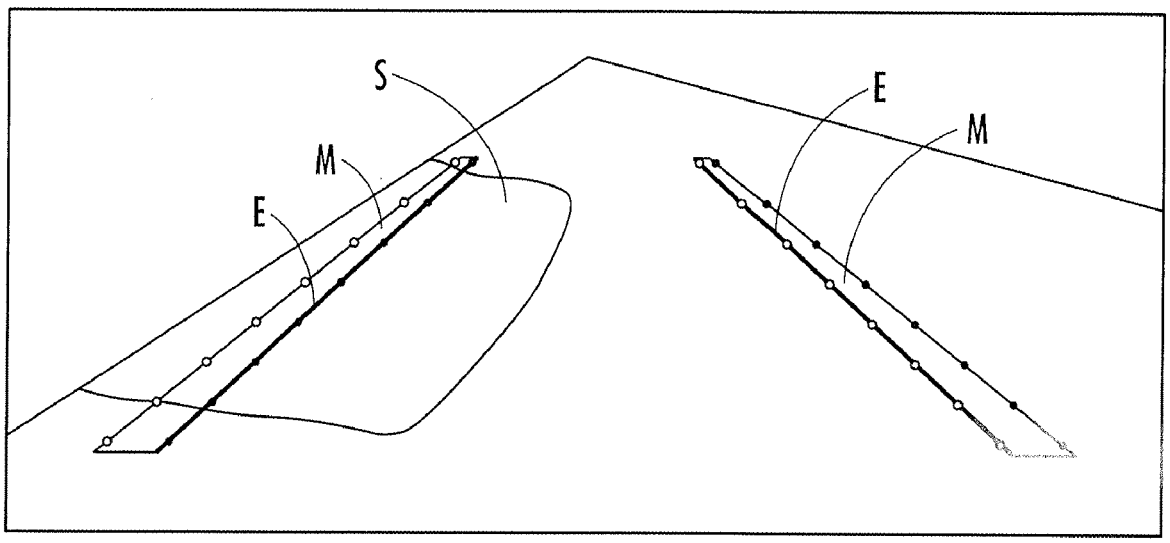
FIG. 7 is an illustrative diagram of a lane mark recognized in image processing.

The fourth processing section 140 recognizes the area between the left maximum value and the right minimum value of the feature value Qij at each pixel Pij of the road image as the lane mark M, as shown in FIG. 5(b). In other words, as shown in FIG. 7, it recognizes as the lane mark M the area between the point where the feature value Qij is the maximum value (a white point in FIG. 5(b)) and the point where the feature value Qij is the minimum value (a black point in FIG. 5(b)). In addition, the fourth processing section 140 recognizes the edge closer to the center of the traffic lane of both the left and right edges of the lane mark M as an edge E (a thick line in FIG. 7) of the lane mark M.

Thereafter, the electronic control unit 11 controls the travel of the vehicle 10 on the basis of the result of the image processing performed by the image processing system 100, in other words, the result of recognizing the edge E of the lane mark M.

According to the image processing system 100 which performs the image processing method, the color component Rij, Gij, or Bij of the first pixel Pij included in the area Aij set in the road image is corrected with reference to the sum total R ($=\Sigma kRik$), G ($=\Sigma kGik$), or B ($=\Sigma kBik$) of the color component of the second pixels Pik based on the sum total V ($=\Sigma kVik$) of the luminance value of the second pixels Pik. In other words, the color component Rij, Gij, or Bij of the first pixel Pij is corrected with reference to the ratio R/V, G/V, or B/V of the sum total R, G, or B of the color component to the sum total V of the luminance value of the second pixels Pik (S120 in FIG. 2 and equations (1) to (3)). Furthermore, the feature value Qij of the first pixel Pij is calculated on the basis of the color component Rij, Gij, or Bij of the first pixel Pij based on the luminance value Vij of the first pixel Pij. In other words, it is calculated on the basis of a ratio Rij/Vij, Gij/Vij, or Bij/Vij of the color component to the luminance value of the first pixel Pij (See S130 in FIG. 2 and equations (5a) and (5b)). This reduces the effect of the shadow or light on the road surface and thereby the actual color of the road surface portion corresponding to the first pixel Pij can be sufficiently reflected in the color components Rij, Gij, and Bij of the first pixel Pij and consequently in the feature value Qij.

The area Aij is set while it is gradually moved (S103 and S110 in FIG. 2). The pixel at the front end of the area Aij in the moving direction is considered as the first pixel Pij among the plurality of pixels included in the area Aij and other pixels are considered as the second pixels Pik (k<j) (See FIG. 4). Therefore, when the color of the road surface portion corresponding to the front end of the area Aij becomes different from the color of the road surface portion corresponding to the front end of the area Aij set at the previous time, the color of the road surface portion corresponding to the first pixel Pij is different from the color of the road surface portion corresponding to a part or all of the second pixels Pik as shown in FIG. 6(a) or FIG. 6(d). Consequently, the color component Rij, Gij, or Bij of the first pixel Pij is corrected with reference to the sum total R, G, or B of the color component of the second pixels Pik as described above, by which the actual color of the road surface portion corresponding to the first pixel Pij can be prominently reflected in the color components Rij, Gij, and Bij of the first pixel Pij and consequently in the feature value Qij that depends on the noticeable color (See FIG. 5(b)).

Furthermore, the feature value Qij of the first pixel Pij is calculated in consideration of the luminance value Vij of the first pixel Pij and the sum total V of the luminance value Vik of the second pixels Pik (see S130 in FIG. 2 and equations (1) and (4)). This prevents the situation where the feature value Qij of the first pixel Pij becomes excessively large or small due to a difference in brightness instead of due to the color of the first pixel Pij and the second pixels Pik. For example, it is possible to prevent a situation where the feature value Qij of the first pixel Pij (particularly, the feature value Qij calculated according to equation (5a)) significantly changes and thereby the first pixel Pij is incorrectly determined to correspond to the edge E of the lane mark M due to a difference in brightness between the first pixel Pij and the second pixels Pik in the boundary position Xj3 between the dark road surface portion in the shadow S and the bright road surface portion outside the shadow S as shown in FIG. 5(a).

According to the above view, the image processing system 100 can recognize the lane mark M and its edge E having the noticeable color in the road image with high accuracy even if the light illumination state on the road surface is partially different. Moreover, the travel of the vehicle 10 can be appropriately controlled in view of the actual position of the lane mark M and its edge E on the basis of the image processing result achieved by the image processing system.

Furthermore, in the vehicle of the present invention the first processing section 110 can set the area Aij while adjusting the size, shape, or size and shape according to the position of the road image. Specifically, for example, the width of the area Aij shown in FIG. 4 is set to be smaller toward the top of the road image as described above.

If the color of the road surface portion corresponding to the first pixel Pij of the area Aij set at this time becomes different from the color of the road surface portion corresponding to the first pixel pij-1 of the area set at the previous time (for example, if the color changes from the state shown in FIG. 6(c) to the state shown in FIG. 6(d)), one or both of the size and shape of the area Aij can be adjusted so that the color of the road surface portion corresponding to the first pixel Pij is different from the color of the road surface portion corresponding to all or most of the second pixels Pik in the area Aij set at this time. Thereby, the actual color of the road surface portion corresponding to the first pixel Pij can be prominently reflected in the color components of the first pixel Pij and consequently in the feature value Qij that depends on the noticeable color. Therefore, even if the light illumination state on the road surface is partially different, the image processing system 100 can recognize the lane mark having the noticeable color in the road image with high accuracy (See FIG. 7). Additionally, the travel of the vehicle 10 can be appropriately controlled in view of the actual position of the lane mark M and its edge E on the basis of the image processing result achieved by the image processing system 100.

Although the color signal of each pixel is represented in the RGB component system in the above embodiment, the color signal of each pixel can be represented in a different color system from the RGB color system such as, for example, the CMY or YIQ color system as another embodiment.

Figure 8A:
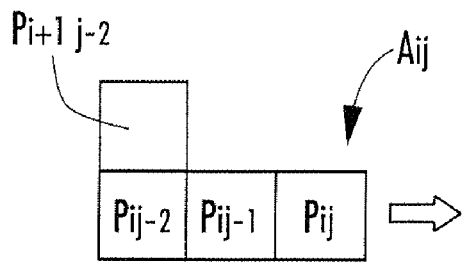
FIG. 8 is another illustrative diagram of an area which is set in the first processing.

Although the area Aij having the size and shape of one row by four columns (a plurality of columns) is set as shown in FIG. 4 in the above embodiment, an area Aij various in size and shape as described below can be set as another embodiment. Specifically, as shown in FIG. 8(a), it is possible to set an area Aij having a part extending forward in the moving direction such as including the first pixel Pij at the right end (the front end in the moving direction) and pixels Pij-1, Pij-2, and Pi+1j-2 located on the left side (in the rear in the moving direction) of the first pixel Pij. Furthermore, as shown in FIG. 8(b), it is possible to set an area Aij including a plurality of separated pixels such as including the first pixel Pij at the right end, pixels Pij-2, Pij-3, and Pij-4 located on the left side of the first pixel Pij.

Figures 8B, 8C:
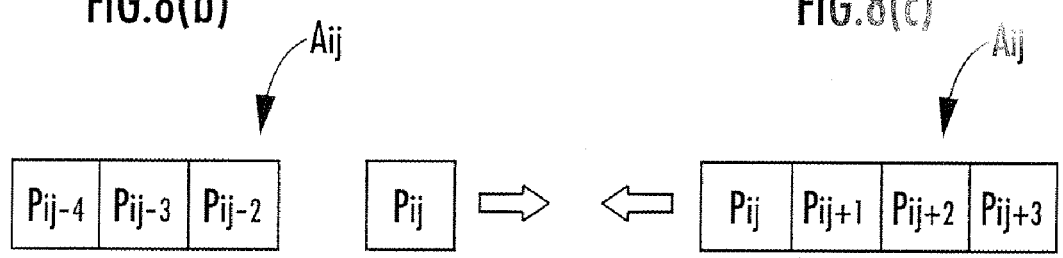

Although the area Aij is updated in such a way as to gradually move to the right in each row in the above embodiment, the area Aij can be updated so as to gradually move to the left in each row as shown in FIG. 8(c) as another embodiment, and can be also updated such that the area Aij can move gradually to the right in one row while it gradually moves to the left in another row. In the case where the area Aij is updated so as to gradually move to the left in the road image, the second processing (S120 in FIG. 2) is performed with the leftmost pixel considered as the first pixel Pij and pixels on the right side of the first pixel Pij considered as the second pixels Pik (k>j) among the plurality of pixels included in the area Aij.

Figures 8D, 8E:
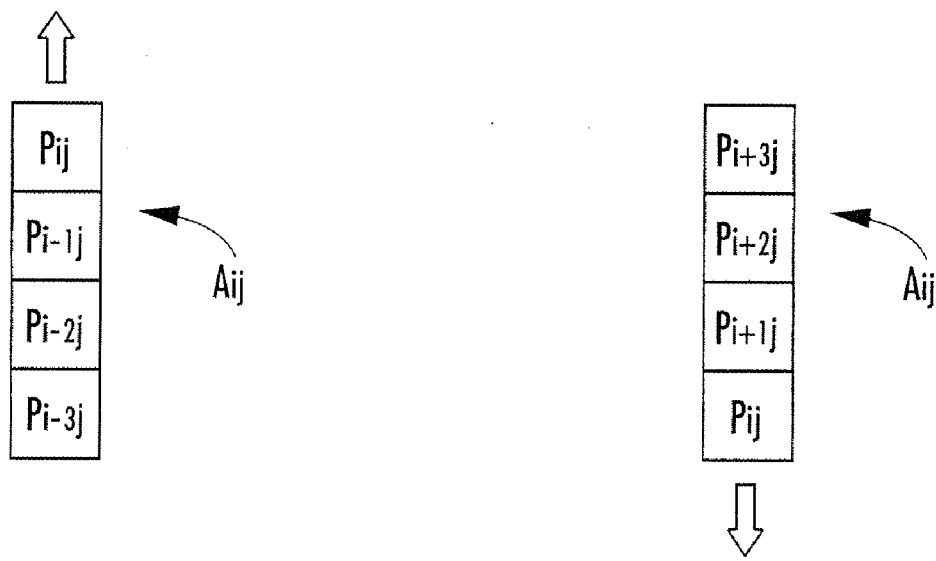

Furthermore, although the horizontally extending area Aij is updated so as to gradually move in the horizontal direction in the above embodiment, it is also possible to update a vertically extending area Aij (or having a vertically extending part more forward in the traveling direction) in such a way as to gradually move in the upward and downward directions or in the upward or downward direction of each row as shown in FIG. 8(d) or FIG. 8(e) as another embodiment. If the vertically extending area Aij is updated so as to gradually move in the upward and downward directions in the road image, the second processing (S120 in FIG. 2) or the like is performed with the uppermost or lowermost pixel considered as the first pixel Pij and pixels lower or upper than the first pixel Pij considered as the second pixels Pik (k>j) among the plurality of pixels included in the area Aij.

Furthermore, as another embodiment, the area Aij can be updated in such a way as to move in units of two pixels in the horizontal direction and to move in units of one pixel in the vertical direction, in other words, in such a way as to move in an oblique direction in the road image.

If the second pixels Pik included in the area Aij are too few, only the color of the road surface portion which is locally different from the original noticeable color due to peeling-off or the like of the lane mark M might be reflected in the color components Rik, Bik, and Gik of second pixels Pik. It therefore could lead to an excessive correction amount of the color component Rij, Bij, or Gij of the first pixel Pij based on the color component Rik, Bik, or Gik of the second pixels Pik in the area Aij set at this time. Consequently, there is a possibility of a reduction in accuracy of recognizing the lane mark M based on the feature value Qij that depends on the noticeable color of the first pixel Pij such that a faded portion of the lane mark M is recognized as the edge E of the lane mark M.

On the other hand, if the second pixels Pik included in the area Aij are excessively large, a plurality of colors existing in the road surface portion corresponding to the area Aij might be reflected in the sum total R=ΣkRik, B=ΣkBik, and G=ΣkGik of the color components of the second pixels Pij. Therefore, there is a possibility of an insufficient correction amount of the color component Rij, Bij, or Gij of the first pixel Pij based on the color component Rik, Bik, or Gik of the second pixels Pik in the area Aij set at this time. Consequently, there is a possibility of a reduction in accuracy of recognizing the lane mark M based on the feature value Qij that depends on the noticeable color of the first pixel Pij such that the edge E of the lane mark M is not recognized as a true edge E.

Furthermore, in which position the lane mark is recognized to be located in the road image depends on the previous recognition result of the lane mark M (and its edge E). For example, the lane mark M is unlikely to be recognized in a position that seriously lacks validity (for example, continuity) in view of the position of the lane mark M recognized at the previous time in the road image though the traveling condition of the vehicle 10 is stable, and the travel of the vehicle 10 should not be controlled on the basis of the recognition result that lacks validity.

Additionally, in which position the lane mark is recognized to be located in the road image also depends on the traveling condition of the vehicle 10. For example, when the vehicle 10 is traveling while making a curve to the left, it is predicted that the lane mark is recognized in the position depending on the degree of the curve of the road in the road image.

Thus, the area Aij can be reset or set anew after one or both of its size and shape are adjusted on the basis of the correction result of the color component of the first pixel Pij (S120 in FIG. 2), the calculation result of the feature value Qij that depends on the noticeable color of the first pixel Pij (S130 in FIG. 2), the recognition result of the lane mark M (S140 in FIG. 2), and a part or all of the traveling condition including the speed or yaw rate of the vehicle 10 measured by a speed sensor or a yaw rate sensor (not shown) mounted on the vehicle 10.

According to the image processing system 100 of this embodiment, it is possible to prevent the setting of the area Aij that leads to a reduction in the recognition accuracy of the lane mark M and to improve the recognition accuracy of the lane mark M in view of the above circumstances. Then, the travel of the vehicle 10 can be controlled appropriately in view of the actual position of the lane mark on the basis of the image processing result.

In the above embodiment, after the right end (the first pixel) of the area Aij reaches the right end of the image (S104 in FIG. 2: YES), the area Aij is moved to another pixel row (S105 in FIG. 2). Moreover, in the above embodiment, the area Aij is moved in such a way that the initial position of the left end of the area Aij in each pixel row matches the left end of the image (See S102 in FIG. 2). As another embodiment, after the right end (the front end) of the area Aij reaches a position a little to the left of the right end of the image, the area Aij can be moved to another pixel row. In other words, in S104 of FIG. 2, the threshold for the line feed of the area Aij (the threshold is hereinafter referred to as "right boundary value") can be set to a smaller value than the number of horizontal pixels m of the image. In addition, the initial position of the left end (back end) of the area Aij in each pixel column can be located slightly to the right of the left end of the image. In other words, in S102 of FIG. 2, the index representing the initial position of the right end of the area Aij (the index is hereinafter referred to as "left boundary value") can be set to a greater value than "4."

For example, the area Aij can be adjusted in such a way that one or both of the right boundary value and the left boundary value increase toward the top of the rows (as the index i representing the number of rows increases). This causes the region where the area Aij can be scanned to have a trapezoidal or triangular shape which becomes gradually smaller in width toward a distal end in the captured image. In other words, the operating region of the area Aij can be narrowed down only to the region in which it is highly probable that the lane mark M exists in the captured image (see FIG. 3 and FIG. 5(a)). Moreover, it is possible to increase the speed of the image processing and to save the information processing resources necessary for the image processing or the like.

In addition, one or both of the right boundary value and the left boundary value can be adjusted according to the traveling condition including the speed or yaw rate of the vehicle 10 measured by the speed sensor or the yaw rate sensor (not shown) mounted on the vehicle 10.

The invention claimed is:

1. An image processing system comprising a processor, comprising:
a first processing section which sets an area including a plurality of pixels while gradually moving the area in a road image captured by an imaging means mounted on a vehicle;
a second processing section which corrects a color component of a first pixel included in the front end of the area in a moving direction among the plurality of pixels included in the area by the first processing section with reference to a corresponding color component of a second pixel other than the first pixel among the plurality of pixels;
a third processing section, executed via the processor, which calculates a feature value of the first pixel that depends on a noticeable color on the basis of the color component of the first pixel corrected by the second processing section; and
a fourth processing section which recognizes a lane mark having the noticeable color in the road image on the basis of feature values of a plurality of pixels obtained by sequentially repeating the correction of a color signal of the first pixel by the second processing section and the calculation of the feature value of the first pixel by the third processing section whenever the area is set by the first processing section;

wherein the area is adjusted based upon the result of the correction of the color component of the first pixel.

2. The image processing system according to claim 1, wherein the first processing section sets a one-line continuous area arranged in the moving direction in the road image or an area having a one-line continuous part arranged more forward in the moving direction than the remainder of the area.

3. The image processing system according to claim 1 wherein the first processing section can set the area while adjusting the size, shape, or size and shape of the area according to the position of the road image.

4. The image processing system according to claim 1 wherein the first processing section can set the area while adjusting the size, shape, or size and shape of the area on the basis of a result of the correction of the color component of the first pixel by the second processing section, a result of the calculation of the feature value of the first pixel by the third processing section, a result of the recognition of the lane mark by the fourth processing section, and a part or all of the traveling condition of the vehicle.

5. The image processing system according to claim 1 wherein:

the second processing section corrects the color component of the first pixel with reference to the color component of the second pixel based on a luminance value of the second pixel; and the third processing section calculates the feature value of the first pixel that depends on the noticeable color on the basis of the corrected color component of the first pixel based on a luminance value of the first pixel.

6. An image processing method comprising:

a first processing step of setting an area including a plurality of pixels while gradually moving the area in a road image captured by an imaging means mounted on a vehicle;

a second processing step of correcting a color component of a first pixel included in the front end of the area in a moving direction among the plurality of pixels included in the area in the first processing step with reference to a corresponding color component of a second pixel other than the first pixel among the plurality of pixels; a third processing step of calculating a feature value of the first pixel that depends on a noticeable color on the basis of the color component of the first pixel corrected in the second processing step; and a fourth processing step of recognizing a lane mark having the noticeable color in the road image on the basis of feature values of a plurality of pixels obtained by sequentially repeating the correction of a color signal of the first pixel in the second processing step and the calculation of the feature value of the first pixel in the third processing step whenever the area is set in the first processing step;

wherein the area is adjusted based upon the result of the correction of the color component of the first pixel.

7. An image processing program comprising a non-transitory computer usable medium for causing a computer to attain:

a first processing function of setting an area including a plurality of pixels while gradually moving the area in a road image captured by an imaging means mounted on a vehicle;

a second processing function of correcting a color component of a first pixel included in the front end of the area in a moving direction among the plurality of pixels included in the area by the first processing function with reference to a corresponding color component of a second pixel other than the first pixel among the plurality of pixels;

a third processing function of calculating a feature value of the first pixel that depends on a noticeable color on the basis of the color component of the first pixel corrected by the second processing function; and a fourth processing function of recognizing a lane mark having the noticeable color in the road image on the basis of feature values of a plurality of pixels obtained by sequentially repeating the correction of a color signal of the first pixel by the second processing function and the calculation of the feature value of the first pixel by the third processing function whenever the area is set by the first processing function;

wherein the area is adjusted based upon the result of the correction of the color component of the first pixel.

8. The image processing program according to claim 7, wherein the image processing program is distributed or broadcast to a computer mounted on the vehicle.

9. A vehicle having:

an imaging means;

an image processing system which performs image processing on the basis of a road image captured by the imaging means; and a vehicle traveling control system which controls the travel of the vehicle on the basis of a result of the image processing performed by the image processing system, wherein the image processing system includes:

a first processing section which sets an area including a plurality of pixels while gradually moving the area in the road image;

a second processing section which corrects a color component of a first pixel included in the front end of the area in a moving direction among the plurality of pixels included in the area by the first processing section with reference to a corresponding color component of a second pixel other than the first pixel among the plurality of pixels;

a third processing section which calculates a feature value of the first pixel that depends on a noticeable color on the basis of the color component of the first pixel corrected by the second processing section; and a fourth processing section which recognizes a lane mark having the noticeable color in the road image on the basis of feature values of a plurality of pixels obtained by sequentially repeating the correction of the color component of the first pixel by the second processing section and the calculation of the feature value of the first pixel by the third processing section whenever the area is set by the first processing section;

wherein the area is adjusted based upon the result of the correction of the color component of the first pixel.

10. The vehicle according to claim 9, wherein the first processing section sets a one-line continuous area arranged in the moving direction in the road image or an area having a one-line continuous part arranged more forward in the moving direction than the remainder of the area.

11. The vehicle according to claim 9 wherein the first processing section can set the area while adjusting the size, shape, or size and shape of the area according to the position of the road image.

12. The vehicle according to claim 9 wherein the first processing section can set the area while adjusting the size, shape, or size and shape of the area on the basis of a result of the correction of the color component of the first pixel by the second processing section, a result of the calculation of the feature value of the first pixel by the third processing section, a result of the recognition of the lane mark by the fourth processing section, and a part or all of the traveling condition of the vehicle.

13. The vehicle according to claim 9 wherein:
the second processing section corrects the color component of the first pixel with reference to the color component of the second pixel based on a luminance value of the second pixel; and
the third processing section calculates the feature value of the first pixel that depends on the noticeable color on the basis of the corrected color component of the first pixel based on a luminance value of the first pixel.

* * * * *